(No Model.)

C. D. HOWARD.
SYSTEM FOR HEATING BUILDINGS.

No. 463,789.   Patented Nov. 24, 1891.

WITNESSES:
J. J. Laass.
Mark W. Dewey

INVENTOR
Charles D. Howard
By Dull, Lausser Dull
his ATTORNEYS.

UNITED STATES PATENT OFFICE.

CHARLES D. HOWARD, OF SYRACUSE, NEW YORK.

SYSTEM FOR HEATING BUILDINGS.

SPECIFICATION forming part of Letters Patent No. 463,789, dated November 24, 1891.

Application filed January 7, 1891. Serial No. 376,951. (No model.)

*To all whom it may concern:*

Be it known that I, CHARLES D. HOWARD, of Syracuse, in the county of Onondaga, in the State of New York, have invented new and useful Improvements in System for Heating Buildings, of which the following, taken in connection with the accompanying drawings, is a full, clear, and exact description.

This invention relates to that class of heating apparatus in which the hot air is generated in a furnace remote from the apartments to be heated, said air being conducted to said apartments by conduits extending from the furnace.

The object of the invention is to guard against the cooling of the air while in transit to the apartments.

To this end the invention consists, principally, in generating hot air in a conduit and supplying the apartments therefrom and means for creating a circulation of air through said apartments and the hot-air conduit, as will be hereinafter more fully described, and specifically set forth in the claims. This object is accomplished by means of the improved system illustrated in the accompanying drawings, in which—

Figure 2:
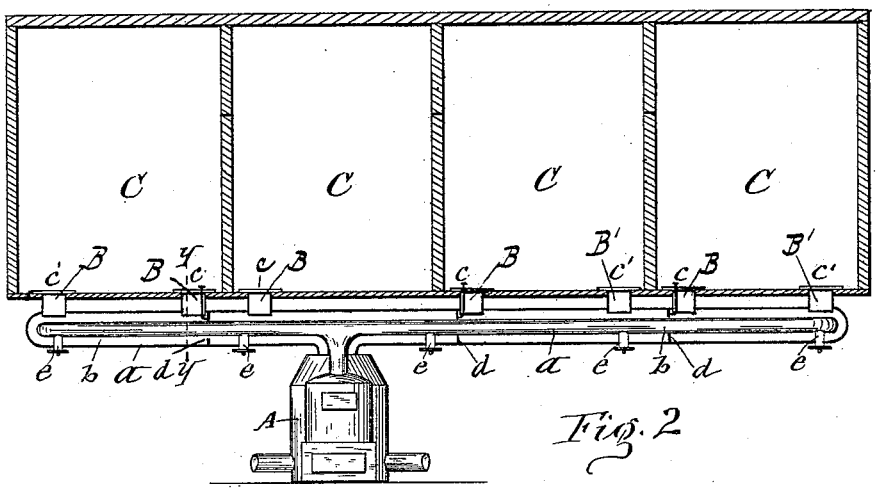
Figure 1:
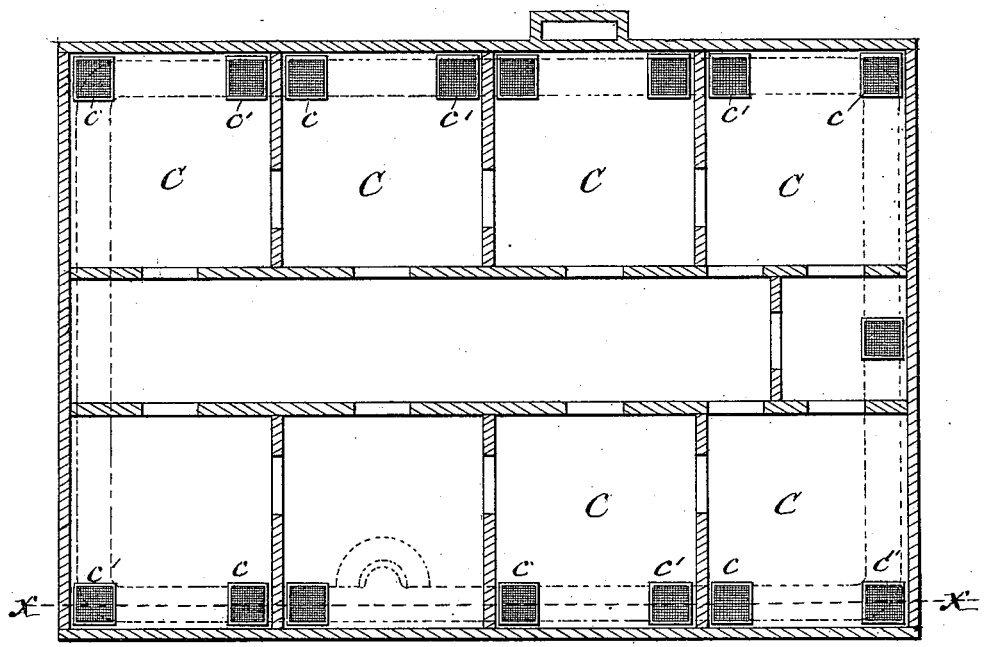

Figure 1 represents a plan view showing the arrangement of the hot-air conduit which conducts the hot air from the furnace to the apartments to be heated. Fig. 2 is a vertical section through one of the hot-air conduits and the apartments immediately above on line $x\ x$ of Fig. 1, and Fig. 3 an enlarged transverse section on line $y\ y$ of Fig. 2.

The letter A indicates the hot-air furnace, which may be of any suitable construction or well-known form.

C C C indicate the apartments of the building to be heated.

$a$ indicates a hot-air conduit connected with and leading from an air-heating chamber surrounding the furnace. Said conduit extends through the building, usually beneath the floors thereof, and any number may be employed, according to the size and internal arrangement of the building to be heated. The several apartments remote from the furnace are connected with the hot-air conduit by air-ducts B and B', one of each in each separate apartment. The duct B is provided with a register $c$, and the duct B' with a register $c'$. These ducts are usually about three feet in length and of about the same diameter as that of the cold-air pipe which conducts the outside air to the heating-chamber.

The smoke or exit flue $b$ of the furnace extends lengthwise through the hot-air conduit, passing out into the chimney or other outlet. The object of extending the smoke-flue throughout the entire length of the air-conduit is to subject the air contained therein to the action of the heat radiating from the exterior of said flue, so that the said air will be maintained hot long distances from the furnace.

Figure 3:
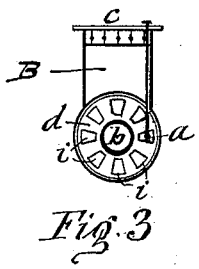

In order to control the quantity of hot air to be admitted to the different apartments, I place in the hot-air conduit a damper $d$ between the adjacent apartments, said damper consisting of two annular plates placed contiguously side by side and across the interior of the conduit, as shown in Fig. 3. These plates are provided with corresponding ports $i\ i$, and one plate is secured stationary in its position, while the other plate rotates on the stationary plate, so as to allow the ports of said stationary plate to be either closed or opened by turning the other plate.

$e\ e$ indicate tubes connected to the smoke-flue. Said tubes extend laterally through the air-conduit and are provided at their outer ends with removable caps. By means of these tubes the interior of the smoke-flue can be cleaned when required.

It will be noticed that in the apartment nearest the furnace there is but one air-duct, and through this duct the heated air from the conduit passes into that apartment. As the cold air is displaced, it escapes out into the open air through the usual ventilating-pipe (not shown) placed in the wall of the apartment and provided with an opening near the floor. In warming the other apartments the register $c$ is opened. The column of heated air in the duct B will immediately rush into the apartment, and, the register $c'$ then being opened, the cool air near the floor will be drawn down through the duct B' into the conduit, where it becomes heated, and again enters the apartment. Thus it will be seen that a complete and continuous circulation is established through the apartment and air-conduit by means of the air-ducts. The exit of the cool air from the apartment is greatly facilitated by the vacuum produced in the conduit, which vacuum is caused by the rush of the lighter and heated air through the duct B into the apartment. This operation will be repeated in each apartment.

It will be understood that the capacity of the cold-air pipe, which conducts the air from the outside to the heating-chamber, is about the same capacity as that of the air-ducts B B', respectively. It will be also understood that there will be two columns of air between an apartment and the air-conduit, and as the air in the duct nearest to the furnace will be warmer than that in the other duct, it being farther removed from the principal source of heat generation, the air in the former will be much lighter than that in the latter. Therefore the lighter air will ascend in the apartment as soon as the register is opened. The rush of the hot and lighter air through the duct B will create a suction in the conduit between the two air-ducts, causing the column of cooler air in the duct B' to be sucked into the conduit, and, the register c' being opened, the cooler air near the floor will decend through the said duct B' into the air-conduit, from whence it will re-enter the apartment after becoming heated by the heat radiating from the exterior of the smoke-flue. The circulation being thus started will be maintained during the running of the furnace.

It will be understood that in heating communicating apartments—that is, apartments whose partitions are provided with openings—it will not be necessary to use both the hot-air register and the cool-air register in each apartment, inasmuch as two communicating apartments may be heated by admitting hot air through one duct to the first apartment and taking cool air through another duct from the other apartment, the operation being the same as hereinbefore described, wherein a hot-air duct and a cool-air duct are used in each separate apartment.

Having thus fully described my invention, what I claim as new, and desire to secure by Letters Patent, is—

1. In an apparatus for heating buildings, the combination, with a hot-air furnace, of a hot-air conduit leading from said furnace, two ducts connecting said conduit with each apartment to be heated, one of said ducts for the admission of hot air into an apartment and the other for the exit of cool air from said apartment, a damper located in the conduit between each apartment for controlling the quantity of hot air to an apartment, and a heat-generator located in the hot-air conduit.

2. In an apparatus for heating buildings, the combination, with a hot-air furnace, of a hot-air conduit leading from said furnace, ducts connecting said conduit with the apartments to be heated, each alternate duct admitting hot air into an apartment and the other permitting the exit of cool air from an apartment, dampers located in the conduit for controlling the quantity of hot air to an apartment, and a heat-generator located in said conduit.

In testimony whereof I have hereunto signed my name this 24th day of December, 1890.

CHARLES D. HOWARD. [L. S.]

Witnesses:
MARK W. DEWEY,
H. M. SEAMANS.